United States Patent [19]
Ryan

[11] 3,784,813
[45] Jan. 8, 1974

[54] TEST APPARATUS FOR PNEUMATIC BRAKE SYSTEM
[75] Inventor: Paul T. Ryan, Erie, Pa.
[73] Assignee: General Electric Company, Erie, Pa.
[22] Filed: June 6, 1972
[21] Appl. No.: 260,123

[52] U.S. Cl............. 246/169 R, 246/30, 340/52 R
[51] Int. Cl............................................. B61l 1/20
[58] Field of Search............ 340/52 R, 52 A, 52 C, 340/59; 246/169 R, 30

[56] References Cited
UNITED STATES PATENTS
| | | | |
|---|---|---|---|
| 2,753,550 | 7/1956 | Treharne, Jr. | 246/30 |
| 2,970,211 | 1/1961 | Karolus | 246/30 |
| 3,534,329 | 10/1970 | Greene | 340/52 C |
| 3,541,310 | 11/1970 | Stites | 246/169 R |

Primary Examiner—Gerald M. Forlenza
Assistant Examiner—George H. Libman
Attorney—Walter C. Bernkopf et al.

[57] ABSTRACT

An apparatus for cyclical testing in integrity of a railway pneumatic brake system. A transmitter and receiver with associated induction loops are situated on opposite sides of the track, and are magnetically coupled to respective inductive coils located on opposite sides of a rearward track car. A switch electrically couples the inductive coils in response to the pneumatic pressure in the brake system, the signal reception from the transmitter to receiver thereby providing an indication of system integrity. In an automatic railroad operation the test can be made by a single person at the remote operation station, or be programmed as part of the control cycle.

9 Claims, 3 Drawing Figures

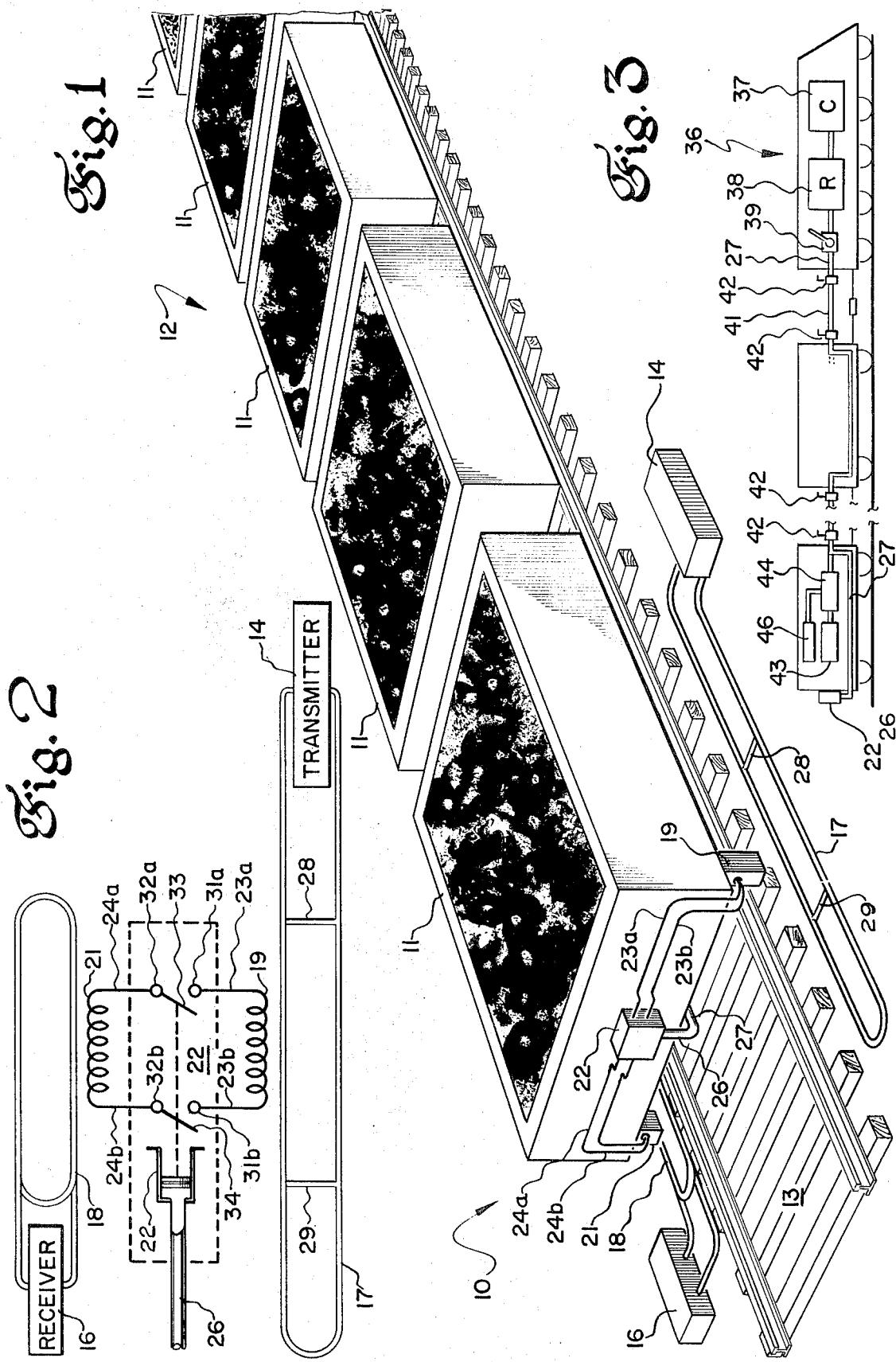

TEST APPARATUS FOR PNEUMATIC BRAKE SYSTEM

BACKGROUND OF THE INVENTION

This invention relates generally to measuring and testing apparatus and more particularly to an electronic apparatus for testing railway brake systems. Train brake systems customarily provide a supply of pressurized air from a compressor on the locomotive to the brake cylinders of the individual cars, the delivery of the air at a standard pressure being accomplished through a brake pipe which extends the length of the train. Hose couplings are provided between cars, and branch pipes are disposed on each car to connect the individual brake cylinders to the brake pipe. The system is charged by operation of the engineer's brake valve on the locomotive to a standard pressure which is regulated by a reducing valve.

Prior art teaches the automatic brake concept, wherein an auxiliary reservoir is provided on each car, and the brakes are applied by a reduction rather than an increase of pressure in the brake pipe. Features of such an arrangement include a quick response on rearward cars of longer trains, and secondly, automatic brake application when a rupture occurs in a connection hose.

In automatic systems the auxiliary reservoir is charged from the brake pipe. If there is initially no pressure in the brake pipe, the auxiliary reservoir will not be charged and there can be no braking on the car. For proper operation of the system two conditions must exist: (1) Pressure at the rear of the train must be above some standard to indicate car brake systems are charged and leakage is below permissible maximum; and (2) Reduction of pressure at the locomotive must cause a reduction of pressure at each car to assure no valves are closed and there is no other blockage of the pipe. (as for example ice in the brakeline).

Common practice has been to visually inspect the brake performance of each car at periodic cycles, such as, for example, the beginning of each round trip. Typically, the engineer applies the brakes and a crew member walks along each side of the train from locomotive to caboose to assure that the brakes are applied to each wheel. Upon reaching the rear of the train, the engineer is notified thereof, and he releases the brakes. The crew members then walk back toward the locomotive to assure that all brakes are released.

The above stated procedure is very time consuming, and an appreciable expense is involved each time the system is checked. A relaxation of the inspection procedures is allowable in certain railway systems. Specifically with a unit train concept, wherein the cars remain together in a fixed sequence, and are systematically phased through periodic maintenance inspections, the inspection of individual cars at the beginning of each run is not necessary. The occurrence of a malfunction between the brake pipe and a small number of the many brake cylinders is not critical; it is only necessary to ensure the proper operation of the entire brake pipe portion of the system. Accordingly, on these trains an abbreviated test procedure is desirable, preferably one which is compatible with an automated concept wherein a single remote control operator or a special portion of the wayside apparatus can conduct the test as well as control the propulsion and braking operations of the train.

It is therefore an object of this invention to provide an improved means of testing the integrity of a pneumatic train-brake system.

Another object of this invention is the provision for conducting a rapid and abbreviated cyclical check of the functioning of a railroad train brake system.

Yet another object of this invention is the provision for a reliable check of the brake pipe portion of the system without inspection of each individual car.

Still another object of this invention is the provision for a rapid and reliable test of selective modulation in an automatic train brake system.

A further object of this invention is the provision for a rapid test of brake system integrity without active communication equipment on the train.

Yet another object of this invention is the provision for remote testing of the functioning of a railroad train brake system.

Still another object of this invention is the provision for reliably testing the brake pipe portion of a train pneumatic brake system by a single operator, or by an automatic control appratus.

Yet another object of this invention is the provision for an apparatus which cyclically tests train brake systems, the apparatus being economical to construct and reliable in use.

These objects and other features and advantages become more readily apparent upon reference to the following description when taken in conjunction with the appended drawings.

SUMMARY OF THE INVENTION

The subject invention assumes that in a pneumatic brake system of the type described hereinabove, if in the last car of the train the air pressure in the brakeline can be selectively modulated by normal brake operation, the integrity of the complete system is shown.

A pressure switch is installed in the brakeline of the last car, and is sensitive to the pressure therein so as to operably couple or uncouple a pair of transversely spaced inductive coils located on either side of the car. As the brakes are alternatively applied and released the switch is accordingly, alternately closed and opened, so that the inductive circuit integrity is indicative of pneumatic system integrity. Sensing of the electrical circuit integrity in the last car is accomplished by the use of a signal transmitter and receiver discriminately placed on opposite sides of the train track in close proximity to the receptive inductive coils. Both the transmitter and receiver have inductive loops which are magnetically coupled to the inductive coils aboard the train car. When a signal is transmitted on the loop at one side of the car, its reception or failure of reception at the loop on the other side thereof is indicative of the pressure switch position.

In an automated system, a wayside control program commands the locomotive to make a sequence of brake applications and releases, while at the same time signals are caused to be impressed by the transmitter. If the integrity of the pneumatic system is complete, a corresponding pressure switch action will be evidenced by reception at the wayside loop receiver as detected by the checking apparatus. If the complete sequence is not received, it is assumed that a fault exists in the system and the train is not permitted to proceed without further investigation. In the drawings as hereinafter described a preferred embodiment is depicted, however, various other modifications and alternate constructions can be made thereto without departing from the true spirit and scope of the invention.

BRIEF DESCRIPTION OF THE DRAWINGS

FIG. 1 is a perspective view of the test arrangement as installed on a conventional railway train.

FIG. 2 is a schematic illustration of the electrical circuitry of the preferred embodiment.

FIG. 3 is a typical schematic illustration of the pneumatic circuitry in a train to which application of this invention is well suited.

DESCRIPTION OF THE PREFERRED EMBODIMENT

Reference is now made to FIG. 1 wherein the test apparatus 10 is shown installed, with a mobile portion on a car 11 of a conventional railway train 12, and a stationary portion at the wayside of the railway 13 on which the train operates. The apparatus provides a method of detecting a condition of the car by utilizing electrical signals generated at the wayside. No requirement exists for active communication equipment aboard the train itself.

Stationary equipment comprises a transmitter 14 and receiver 16 located on opposite sides of the track and having associated inductive loops 17 and 18, respectively. Discriminate placement thereof allows the passive equipment located on the car to come in close proximity, and operate in combination therewith, to facilitate conduct of the test procedure. Spacing of the transmitter and receiver are such that electrical signals generated at the transmitter are not received at the receiver 16 without the introduction of an intermediate circuitry which is provided on the train car. Transmission across the circuitry is dependent upon the existence of a physical condition on the train, as for example, the condition of a pneumatic brake system extending the length of the train. It should be noted that the apparatus may be used to detect and indicate the status of any of a number of possible systems; however, for the sake of description it will be described in terms of use with a pneumatic brake system.

The passive apparatus located on board the train comprises a first inductive device 19, a second inductive device 21 and a coupling device 22 for electronically coupling the inductive coils 19 and 21. As shown in FIG. 1 placement of these devices is such that when the car 11 is stopped at the proper position on the track, the devices 19 and 21 are in close proximity to the inductive loops 17 and 18, respectively so as to present a condition of inductive coupling there between. A typical installation is illustrated wherein the inductive devices are attached to the underside of the car 11 at the rearward corners thereof, and depend directly over the loops 17 and 18 to establish inductive coupling. Specific distances between the fixed and moveable loops are dependent on a number of factors, such as transmission frequency, number of turns in the coils; and amount of power available. The coupling device 22 is located midway between the inductive devices 19 and 21 and is electronically connected thereto by leads 23a and 23b and 24a and 24b respectively. It is responsive to the particular system for which detection is desired and is connected thereto by an input line 26.

In the pneumatic brake system, with which use of this invention is well suited, the input line 26 connects the coupling device 22 to the brakeline 27. The brakeline 27 extends the length of the train and receives a supply of compressed air from the locomotive, as will be more fully described hereinbelow. The coupling device 22 is responsive to the pressure in the brakeline 27 to differentiate between a brakes-applied condition and a brakes-released condition as set at the locomotive end of the train. It is contemplated that the test apparatus be installed in the last car of the train. Illustrated in FIG. 2 is a schematic representation of the active and passive portions of the apparatus circuitry. The spaced transmitter and receiver 14 and 16 are connected to the elongate loops 17 and 18 respectively, the loops extending in parallel relationship along opposite sides of the tracks. Their lengths are sufficiently long to allow for ease in bringing the moveable coils 19 and 21 in contiguity therewith, the only requirement for proper use of the test apparatus being that the cars be adjacent to the loops at any point along their lengths. A pair of transpositions 28 and 29 are made across the loop 17 to minimize interferences with the adjacent railroad tracks, and to minimize leakage of the signal from the transmitter 14 directly to the receiver 16. A typical arrangement would provide a transmitter loop 17 of 60 feet in length, with transpositions therein spaced 30 feet apart to define the operational limits in which it is effective for use in conduct of the test. The receiver loop 18 would have a length of 30 feet and would be located directly opposite this effective portion. With regard to other dimensioned requirements, they may be designed to optimize the performance characteristics of the system; however, design parameters of existing equipment associated with the railway may necessitate adaptation thereto for functional and economical practicality. For example, it has been found that with a transmission frequency of 4650 HZ (using power available on existing control circuits), the use of 12 turns on the transmission loop and 25 turns on the receiver loop, proper operation of the system requires that the moveable coils 19 and 21 be disposed within approximately 4 inches of the stationary loops 17 and 18. If higher frequencies or greater power levels are utilized, this distance may be increased to a value more favorable to dimensional design criteria.

The inductive devices 19 and 21 are capacitance tuned at the specific operating frequency as to maximize the current induced therein. Leads 23 and 24 connect them to terminals 31a and 31b and 32a and 32b respectively, of the coupling device 22. The coupling device is responsive to a condition on the train (i.e. air pressure in the brake pipe) to change the current flow between the inductive coils 19 and 21. Various devices may be so employed. That shown is a simple pressure switch adapted to assume either of two positions: (1) closed, wherein induced current will flow between the coils 19 and 21; and (2) open, wherein no current flows there between. Under the first condition a signal generated by the transmitter will be detected by the receiver 16, while under the latter, no reception will be made at the receiver. The pressure switch contactors 33 and 34 operate to open or close in response to the air pressure in the input line 26 and the brakeline 27 (FIG. 1). The closed position of the switch may be made to correspond to either a state of reduced pressure, (as would exist in the present system when the brakes are applied) or to a state of increased pressure (as would exist when the brakes are released). The latter arrangement is shown in FIG. 2 and is assumed to be that used in the testing process described hereinbelow. Shown in FIG. 3 is a schematic illustration of a pneumatic brake system commonly in use on a railway train 12. Located in the locomotive 36 is a compressor 37 fluidly connected through a main reservoir 39 and a brake valve 39, to the brakeline 27 extending the length of the train. Compressed air is supplied by the compressor and held in, the main reservoir 38 at a substantially constant pressure. In the normal operating condition the brake valve 39 is in the release position, which allows the compressed air to flow through the brake pipe 27 to the last car 11 of the train where the pressure remains substantially constant at a value slightly reduced from that in the main reservoir 38. Interconnecting the brake pipe of adjacent cars are flexible hoses 41 with associated couplings. Cocks 42 are provided at each car to close off the brake pipe to the rearward flow of air, and must be left open for proper operation of the system along the entire length of the train.

Located in each car and comprising a portion of what is called an automatic air brake system is an auxiliary reservoir 43, a valve 44 and at least one brake cylinder 46. During operation of the train wherein the brakes are released, the auxiliary reservoirs 43 are charged from the brake pipe with the pressure therein remaining substantially constant. When the brakes are applied at the brake valve 39 in the locomotive, air is exhausted therefrom and the pressure is reduced in the brakeline. As a consequence, the valve 44 on each car is opened and the air from its associated auxiliary reservoir 43 is released to the brake cylinder 46 to apply the brakes in the cars. When the brake valve 39 is returned to the release position, the air pressure increases in the main reservoir and brakeline to close the valves 44 on the cars, release their brakes and recharge their auxiliary reservoirs 43.

The feature of this known automatic system is that of safety, in that the brakes are automatically applied when there is a reduction in system air pressure, such as would occur if there was a rupture in one of the interconnecting flexible hoses.

Automated railway systems utilize remote control apparatus to operate the train by either a single operator located at a wayside station or by unattended program control wherein a sequence of actions will result from a wired program in the control relays (not shown) for the zones involved. Both propulsion and braking operations are remotely controlled, the braking procedure being similar to that described above but with the function of the brake valve being controlled electronically instead of manually at the locomotive. Since no crew members are available, it is desirable to have the above described apparatus for use in testing operation of the brake system.

In using this test system it is assumed that if in operating the brake the air supply is properly modulated in the last car of the train, the brakes in the cars forward thereof will operate properly. A typical method of checking the system integrity may be described as follows. Clearance of the track from the preceding track circuit initiates a stop command to the locomotive, wherein the last car will stop at a position adjacent to the stationary loops 17 and 18. (It is contemplated that train positioning will not require the application of the train brakes to stop the last car at the loop, but rather that speed control be maintained to permit coasting to the desired position). Upon reaching the wayside loops, the pressurized brake pipe will cause the pressure switch to close and a signal will be seen at the receiver 16. A command will then be given at the wayside control station to apply the brakes, which will result in lowering the brake pipe pressure, opening the switch, and cessation of signal reception at the receiver 16. Another command to release the brakes should cause reception to resume and indicate that modulation is satisfactory to thus complete the test cycle and permit the train to be dispatched. If the programmed signals are not received, the speed command will remain at stop and a suitable alarm will indicate a need for corrective action.

What I claim as new and desire to secure by Letters Patent of the United States is:

1. An apparatus for testing a pneumatic system on a tracked vehicle, the apparatus comprising:
   a. a signal producing means disposed on the track wayside in close proximity to the track;
   b. a first inductive device located on the vehicle for selective stationing adjacent said signal producing means so as to be magnetically coupled thereto when a signal is produced therein;
   c. a second inductive device located on the vehicle in spaced relationship to said first inductive device;
   d. coupling means located on the vehicle for electrically coupling said first and second inductive devices in response to the condition of a pneumatic system aboard the vehicle; and
   e. a signal receiving means disposed on the track wayside in spaced relationship to said signal producing means, said signal receiving means being adjacent and magnetically coupled to said second inductive device when the vehicle is selectively stationed, so as to be responsive to said signal producing means through said coupling means.

2. An apparatus as set forth in claim 1 wherein said pneumatic system comprises a pneumatic brake system having an air supply line extending the length of the train, and further wherein said inductive devices and said coupling device are located proximate the rearward end thereof.

3. An apparatus as set forth in claim 2, wherein said signal producing means and said signal receiving means have associated elongate inductive loops aligned in parallel relationship with the trackway.

4. A system for testing the integrity of a pneumatic brake system of a railway train having an air supply line extending the length thereof, the supply line adapted to have the pressure varied therein to effect braking of the train, the system comprising:
   a. a signal producing means disposed on the track wayside in close proximity to the track;
   b. a first inductive device located on the train for selective stationing adjacent to said signal producing means so as to be magnetically coupled thereto when a signal is produced therein;
   c. a second inductive device located on the train in spaced relationship to said first inductive device;
   d. a pressure switch located on the train for electrically coupling said first and second inductive devices in response to the pressure in the air supply line; and e. a signal receiving means disposed on the track wayside in spaced relationship to said signal producing means said signal receiving means being adjacent and magnetically coupled to said second inductive device, so as to be responsive to said signal producing means through said coupling means.

5. A system as set forth in claim 4 wherein said signal producing means and said signal receiving means are disposed on opposite sides of the trackway, and said first and second inductive devices are located on opposite sides of the train.

6. A system as set forth on claim 4 wherein said inductive devices and said coupling devices are located proximate the rearward end of the train and comprise the sole brake test apparatus thereon.

7. A system as set forth in claim 4 wherein said signal producing means and said signal receiving means have associated elongate inductive loops aligned in parallel relationship with the trackway.

8. A system as set forth in claim 7 and including a plurality of transpositions coupled across said elongate inductive loop of said transmitter, to minimize the induction of current into the railway.

9. A system as set forth in claim 4 wherein said first and second inductive devices are capacitance tuned to the frequency of said signal producing means to maximize the current flow therein.

* * * * *